United States Patent [19]

Vogg et al.

[11] Patent Number: 4,583,896

[45] Date of Patent: Apr. 22, 1986

[54] LOCKING AND RESTRAINING CARGO IN AN AIRCRAFT

[75] Inventors: Günter Vogg, Bremen; Hartmut Sempert, Delmenhorst; Wilfried Eilenstein, Stuhr, all of Fed. Rep. of Germany

[73] Assignee: Vereinigte Flugtechnische Werke GmbH, Bremen, Fed. Rep. of Germany

[21] Appl. No.: 501,415

[22] Filed: Jun. 6, 1983

[30] Foreign Application Priority Data

Jun. 12, 1982 [DE] Fed. Rep. of Germany ....... 3222202

[51] Int. Cl.⁴ .................... B60P 1/64; B64C 1/22
[52] U.S. Cl. .................. 410/69; 244/118.1; 410/77; 410/92
[58] Field of Search ............. 410/52, 69, 77, 90, 410/70, 78, 79, 92; 244/118.1, 137 R, 137 L; 292/97, 113

[56] References Cited

U.S. PATENT DOCUMENTS

| 2,961,262 | 11/1960 | Nockels | 292/113 |
| 3,108,833 | 10/1963 | Christensen et al. | 292/113 |
| 3,174,784 | 3/1965 | Swanson | 292/113 |
| 3,182,608 | 5/1965 | Mollon | 244/137 R X |
| 3,698,679 | 10/1972 | Lang et al. | 410/69 |
| 3,927,622 | 12/1975 | Voigt | 410/79 |
| 3,933,101 | 1/1976 | Blas | 410/69 |
| 4,053,177 | 10/1977 | Stammreich et al. | 292/113 |
| 4,134,345 | 1/1979 | Baldwin et al. | 410/70 |

FOREIGN PATENT DOCUMENTS 1481449  7/1977  United Kingdom ................. 410/69

OTHER PUBLICATIONS

*Mechanisms, Linkages and Mechanical Controls*, Chironis (Editor), 1965, McGraw-Hill Book Co., p. 156.

*Primary Examiner*—Randolph A. Reese
*Attorney, Agent, or Firm*—Ralf H. Siegemund

[57] ABSTRACT

A locking dog for restraining pieces of cargo in the cargo area of an aircraft is disclosed having a frame in which a locking member is pivotally mounted and can be folded down by means of an actuator flap either upon passage of a piece of frieght or manually by pushing the actuator flap down into an overcenter position in which a spring locks the folded down locking member, the member being released upon pulling the actuator flap up and over the dead center position.

10 Claims, 4 Drawing Figures

LOCKING AND RESTRAINING CARGO IN AN AIRCRAFT

BACKGROUND OF THE DISCLOSURE

The present invention relates to the locking and restraining of pieces of freight in the cargo space of aircraft and including so-called locking dogs of the fold down variety, so that they can be rolled over by freight.

Locking dogs of the type to which the invention pertains is usually pivotally mounted in a case, frame or the like, which in turn is inserted in a rail, there being a grid of such rails in the floor of the cargo space of the aircraft. The locking dogs of the type to which the invention pertains are sometimes called YZ restrainers, and they are provided to hold pallets and/or containers in a particular position within the cargo space of the aircraft whereby "holding" is to mean the exertion of restraining action for holding the pallet or container against lateral displacements as well as against vertical ones. The locking dogs are therefore constructed to have a latch or locking element or members projecting from the respective mounting case or frame and gripping over ledges and/or other projections of the piece of cargo to be restrained.

The rails in the bottom of the freight space hold these locking dogs which are mounted thereto by means of rapid action locks which can be easily unlocked in order to change the distribution pattern of the locking dogs in the aircraft. One has to adapt this pattern, of course, to the size of the pieces of freight. As stated the locking elements are to be of the fold down type, which means they have, for example, a projecting or fold up position for acting in a restraining capacity as against lateral displacement in one direction which is equivalent to a fold up effecting force direction, while a force when exerted in the opposite direction, for example, by an approaching piece of cargo, causes the latch and locking element to fold down.

The latch elements and locking dogs provided in the past are disadvantaged by the fact that a fold down for purposes of permitting the passage of a piece of cargo in a direction which normally is restrained by the folded up locking element, is rather complicated to attain, therefore, an electrical control or a manual control or a combination of both is required in order to hold the lock element down in this instance and to permit its erection after the piece of cargo has passed. Moreover, this operation is frequently a selective in one that only some lock elements are to be folded down while others are to be maintained in their locking position. It was found that the known locking dogs are not adequate for this purpose.

DESCRIPTION OF THE INVENTION

It is an object of the present invention to provide new and improved cargo restraining locking dogs to be mounted in an aircraft permitting selection of locking and unlocking on an individual basis.

In accordance with the preferred embodiment of the present invention, it is suggested to provide a pivotal locking element or member in a frame, and to fix and establish the upright position of the locking element by means of a tension spring which acts on the locking element eccentrically to its pivot and hinge axis while the other end of the spring is connected to an actuating flap which is also pivotably mounted to the frame, the spring action also eccentrically to the pivot mount or the flap. The flap is connected to the lock element such that the latter will swing back upon pressing down the actuating flap and remain in an overcenter position thereafter until released.

This operating state and this position is obtained by using flat bar means for connecting the free end of the actuating flap, as seen as a one arm lever, to an offcenter point of the locking element or member preferably in a manner permitting a certain idle stroke. Upon fold down of the flap and of the bar means, the locking member is forced to follow and an overcenter or dead center position is established when the pivot point of the flap, the point of articulating the bar means to the flap and the hinge point of the bar means on the locking member are aligned. On a normal operation when freight rolls over the locking dog, the articulating point will not pass the over center position but upon intentional and willful retraction of the locking member by forcing the actuator flap down, the articulating point between the flap and the bar means will pass the over center position and the spring will thereafter tend to maintain the actuator flap as well as the locking member which is forced to follow the fold down motion of the bar means, in the position until pull up of the actuator flap releases the structure permitting the locking member under the influence of the spring to again assume the upright position in which it locks any piece of cargo which acts against it in a direction opposite the direction of regular over rolling as described.

Therefore, the inventive feature and combination of features leads to a locking dog in which the locking member can be naturally folded down by a piece of cargo rolling over it but in which a foot pedal-like actuation will permit the locking element to be folded down and held in the folded down position until intentional released. It can thus be seen that the inventive locking dog is effective simultaneously as an automatic safety device against unintentional and temporary fold down operation. The locking element or member is linked to the actuator flap by means of the aforementioned bar means using pins positioned so that in fact mere push down of the actuator flap to a particular plane level merely causes the locking element to be folded down and to be held down by the piece of freight acting on top of the actuator flap without, however, locking the locking element in a retracted and folded down position. Therefore, as the piece of freight is removed, the locking element will be returned to the upright locking position. Only if the actuator flap is folded down, i.e. pushed down in foot pedal like fashion, to a position below the floor level of a piece of cargo will it be possible to lock the locking element in the retracted and folded down position, because only then will the linking or articulating point between the bar means and the actuator flap be pushed below dead center position. The actuator flap may be provided with a rearward extension serving as a supplemental foot pedal in those cases in which the flap had been pushed down but now wants to be released, converting in effect this one arm lever into a two-arm lever.

The aforementioned idle stroke in the linkage between the actuator flap and the bar means connecting it to the locking element may be obtained by means of an oblong slot in the bar means and a pin laterally projecting from the actuator flap and being held by the confines of the oblong slot. This permits a relative displacement of the actuator flap with respect to the bar means as the pin is moved from one terminal position in the oblong slot to the opposite one; having reached such a position positive articulation and linkage is established and it is that particular point whose position with regard to a dead center position is critical in the aforedescribed operation. This feature permits, in turn, locking of the folded up and upright locking member in the particular position, namely through particular engagement with the actuator flap. The release from this locking position is attained while the idle stroke is performed, i.e., while the connecting pin between actuator flap and bar means traverses the oblong slot.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIGS. 1-4 show a locking dog having a locking element or member 10 which is pivotably mounted in between two side walls 12 of a housing or frame 11. The locking element 10 is provided with a bore which receives a bolt 13, the ends of the bolt 13 are received in appropriate bores in the sidewalls 12 of the frame 11. Bolt 13 as so held establishes a hinge axis for element 10. The Figures illustrate the locking dog in longitudinal section so that only one of the walls 12 is visible. These two walls are interconnected by means of pins or bolts 14 and 15 extending accordingly transversly to the plane of the drawing.

Figure 1:
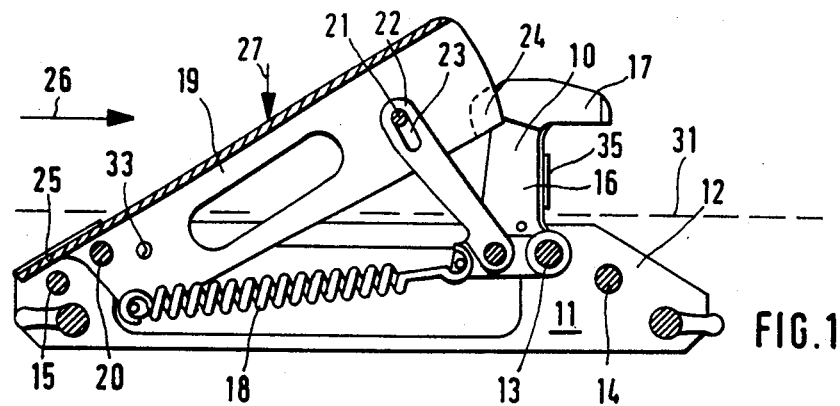
FIG. 1 is a side view of a locking dog with locked and folded up locking element.

The locking element 10 is of a hook shaped configuration and has a transverse nose 17. This nose 17 projects from a pivot arm 16 of the element 10. The pivot arm 16 has a bent off portion or extension which receives the bore which in turn receives the bolt 13. A tension spring 18 is connected to a rearwardly extending or laterally offset portion constituting a kind of lever arm, being particularly laterally displaced from the axis of pin 13, which of course is the pivot axis of the element 10. Therefore, the one end of the spring 18 is affixed to the locking element 10 in a position which is eccentric to the pivot axis of the element itself.

The arrangement includes an actuator flap or pedal 19 which is pivotably mounted by means of a pin 20 which likewise extends between the two sidewalls 12 of the frame 11. Pin 20 establishes a hinge or pivot axis for pedal 19. The flap or pedal 19 therefore has the function of a one-armed lever. The other end of the tension spring 18 is connected to this flap 19 in such a disposition in relation to the pivot axis of the flap or pedal 19 that the spring tend to fold flap 19 up.

Two pins 21 are provided near the free end of pedal or flap 19 and each being articulated with a flat bar 22, each having an oblong slot 23 to take up play and provide an idle stroke. The other ends of the two flat bars 22 are eccentrically articulated to the lever arm 16 of the locking element being the same arm end to which the spring 18 is affixed, but the point is situated between pivot pin 13 and the anchor point for spring 18.

In the folded up and erected state of the dog and particularly of the locking element 10, two cams 24 engage the nose 17. These cams or stops 24 are provided at the front end of the flap 19. The cams or stops 24 therefore hold and lock the element 10 in the upright position. In addition, stops 32 are provided at the arm 16 of locking element 10 which stops bear against the flat bars 22 upon fold up of the locking element 10 for purposes of limiting the pivot motion thereof. Spring loaded balls 33 drop into appropriate openings in the actuator flap 19 holding the flap in the upwardly slanting position against the side walls 12 and thereby holding the locking element 10 in the upright position even if the spring 28 breaks. The holding force of balls 33 can, however, relatively easily be overridden.

A flap part 25 is provided as a rearward extension of the actuator flap or pedal 19. The part 25 extends particularly beyond the pin 20 and serves as release pedal. The flap part 25 when pushed, releases the lock elements 10 when in the fold down position. However, this flap part or release pedal 25 is not essential in principle because the locking element 10 could be folded into the upright position either through pulling up of the actuator flap 19 or by pressing the element 10 down briefly. Omitting the flap part 25 permits in fact a reduction in the overall length of the locking bars, but operation is a little more cumbersome.

As can be seen from all of the Figures, a dog element installed in a mounting rail in the bottom of the cargo department of the aircraft can be folded down without additional manipulation by a piece of cargo itself moving in the direction of arrow 26, i.e. from the left to the right. The upper surface of the flap or pedal 19 serves as a runoff and actuating surface; a piece of cargo that engages that surface will force the flap 19 down in the direction of arrow 27. In view of the oblong slots 23, flap 19 does not provide any immediate action upon the flat bar elements 22. The length of that oblong slot, of course, determines the length of this idle stroke. However, the down pivoting of the flap 19 removes the cams 24 from engagement with latch element 10 so that the wider nose element 17 can enter suitable slots of the flap 19 as that flap is pivoted down further. Accordingly, the locking element 10 can now be folded down.

Figure 2:
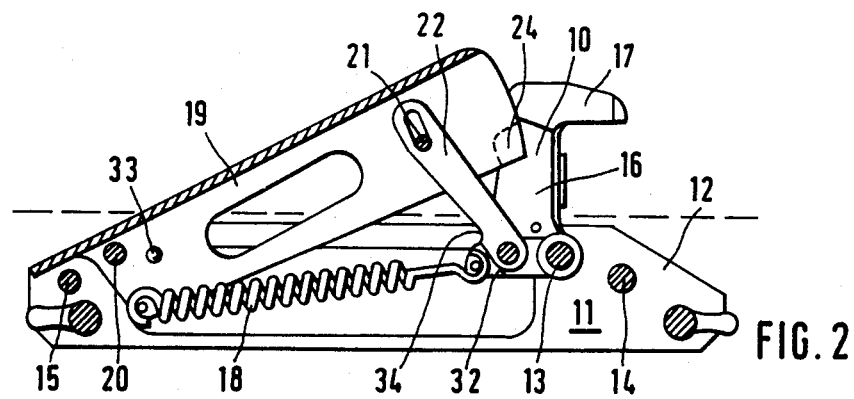
FIG. 2 shows the same locking dog with a folded up locking element but in an unlocked, i.e., released disposition.

FIG. 2 illustrates particularly the instant in which the idle stroke is terminated; the pin 21 has reached a lowermost disposition in oblong slot 23. Moreover, the nose element 17 can now pivot into the slotted actuator 19 because the fold down of the latch and locking elements 10 entails a counterclockwise motion, actuator pedal 19, of course, pivots clockwise.

Figure 3:
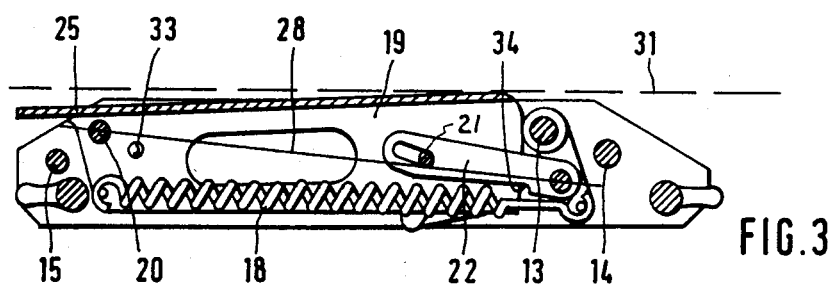
FIG. 3 illustrates the same locking dog shown in FIGS. 1 and 2 with folded down locking element to permit rollover by cargo but without locking the element in the folded down position.

As can be seen from FIG. 3, the actuator flap 19 is pivoted down by means of a piece of freight until its uppermost portion is in the plane 31 of support generally of the freight bottom. However, in this position latch element 10 is not in any locked position; it is simply held down by operation of the arm and bars 22 which had caused the locking element 10 to be folded down. In other words, whenever the latching and locking element is pivotted out of the way through a piece of cargo which presses down the actuating flap 19, this particular actuation is carried out only down to the plane 31. The free end of the lever arm-like actuating flap 19 is not pushed below that plane 31. Therefore, the point of articulation between the actuating lever and flap 19 and the flat bars 22 provided by the pins 21 does not pass across the line 28. Therefore, the actuating flap 19 is not pushed into an overcenter position. This means that as the piece of cargo passes, mere contraction of the spring 18 permits unrestrained clockwise pivoting of the locking arm 10 and the assembly 19 and 22 is re-erected into the disposition shown in FIG. 1.

Figure 4:
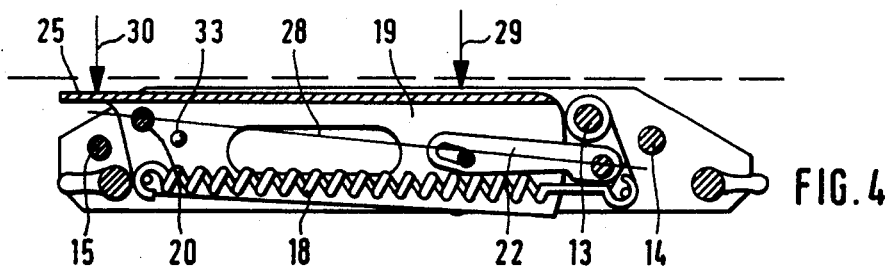
FIG. 4 illustrates a folded down locking element of the same dog shown in FIGS. 1-3, wherein the locking element is retained in the folded down position without being held down by a piece of cargo or otherwise.

The situation is different in the case of willful manual operation of the dog, for example, by means of an operator who presses his foot on the pedal-like actuating flap 19 and pushes the same down but not just into the position shown in FIG. 3, but further as shown in FIG. 4. This results in the following: A line 28 is defined as a hypothetical connection line between the center of the pin 20 (defining the pivot of the actuator flap 19) to the connect point of the bars 22 with the latch element 10, which connect point is, as stated, eccentric to the pivot point and axis of the bearing pin 13 for the latch element 10. If the point of articulation (pin 21) passes that line, flap 19 is pushed into an overcenter position and the tension spring 18 will hold the flap 19 down by operation of its tension. It can readily seen that the line 28 in fact defines a dead center position for the assembly comprised of the actuating flap or pedal 19 and the linkage bars 22. Whenever the connect points between these elements, namely the pin 21, is in that line, the pivot point for the flat bar 22 at locking element 10 has the farthest distance from pivot 20, being the pivot of actuator 19. This then establishes also the point of maximum expansion of the spring 18. Hence, if the assembly 19-22 is moved from a disposition of FIG. 1 or FIG. 2 towards a position shown in FIG. 3, the spring 18 is continuously expanded as the spacing between the anchor pivots of elements 19 and 22 is spaced farther and farther. As the pin 21 traverses the line 28 and moves, so to speak, in down direction that spacing just referred to is permitted to decrease, i.e. if the spring 18 is permitted to contract it will do so unless prevented otherwise, which in fact is a disposition which one could term a final disposition, shown in FIG. 4. Further pivot motion of flap 19 is prevented by the flat bars 22 which already require a notch 34 in order to obtain this position at all. If the locking element 10 is to be folded up again, one has to press down on the rearward extension or release pedal 25 of the flap and in a manner illustrated in FIG. 4, arrow 30. If somebody steps on this extension or pedal 25, the flap 19 is pivoted up. As mentioned earlier, one may dispense with this extension 25 and just pull the flap 19 up wherever it is convenient. Still alternatively, one may force the latch 10 down. The tension spring 18 will be lightly additionally tensioned through the bars 22 briefly pivoting the folded-down latch element 10 counterclockwise so that the actuator flap can traverse the dead center position and pivot up again; element 10 is locked upright by clockwise pivoting. Once the pin 21 is above the line 28, the tension spring 18 can fully provide a contracting action and fold the flap 19 as well as the locking element 10 into the upward position.

It should be noted that a vertical roll 35 is provided at the left arm 10 which roll permits containers and pallets to move in rolling engagement in a direction transverse to the plane of the drawing without affecting the latching action.

The invention is not limited to the embodiments described above, but all changes and modifications thereof, not constituting departures from the spirit and scope of the invention, are intended to be included.

We claim:

1. A locking dog for restraining cargo in the cargo space of aircraft comprising:
   a frame for connection to bottom structure of the aircraft cargo space;
   a locking member with a hook and nose-like projection pivoted on the frame about a first pivot axis, pivoting permitting an upright position of the locking member as well as a fold down position;
   an actuator flap pivoted on the frame about a second pivot axis, being spaced from the first pivot axis and provided for pivoting to assume an upwardly stationary extended position and into a retracted and fold down position;
   bar means pivotally linked to the locking member eccentrically to the first pivot axis, the bar means being articulated to the actuator flap at a point of articulation; and
   tension spring means connected to the actuator flap and to the locking member at connect points eccentric to the first and second pivot axes, so that a dead center position is defined as said point of articulation at the bar means and the actuator flap which point of articulation may pass the dead center position while the actuator flap is pushed down whereupon the spring means tends to hold the locking member in a retracted position while tending to place the locking member into an upright locking position as long as said point of articulation has not passed the dead center position.

2. A locking device as in claim 1 and being mounted in relation to a freight transport bottom and support plane such that said point of articulation will not pass the dead center position when a piece of freight in said plane pushes the actuator flap down.

3. A locking dog as in claim 1, the actuator flap having a rearward extension which upon being pushed down causes the actuator flap to pivot up so that said point of articulation passes said dead center position.

4. A locking dog as in claim 1, said bar means including an oblong slot there being pin means extending from the actuator flap and being guided in said oblong slot of said bar means, the pin means establishing said point of articulation, there being an idle stroke provided when upon pushing down of said actuator flap, said pin means is displaced within said oblong slot.

5. A locking dog as in claim 1 wherein said nose is wider than said actuator flap, the actuator flap provided with recess means to receive said nose.

6. A locking dog as in claim 1, said locking member being provided with a roll engaging a piece of freight for guiding it when moved in a direction transverse to a plane of pivoting up the locking member.

7. A locking dog as in claim 1, including a spring loaded ball for latching and securing the flap and the locking member in the upright position.

8. A locking dog as in claim 1, said locking member having a lever arm from which said nose projects, the arm being provided with stop means bearing against the bar means for limiting pivot motion thereof.

9. A locking dog as in claim 1, said bar means limiting the pivot motion of the actuator flap upon lowering an abutment against the spring means.

10. A locking dog as in claim 1 wherein said actuator flap is pivoted on the second axis near one end of said frame, the spring means being attached to the actuator flap below the first axis, the locking member having an arm which stands in upright position when the locking member is in the freight locking position, said spring means being attached to said arm at a point laterally displaced from the first axis when the locking member is in an upright position, the bar means being pivotally linked to the locking member at a point between the point of attachment of the spring means and of the first axis.

* * * * *